Oct. 10, 1967  A. J. FENTON  3,346,304
AXLE CAP FOR SPORTS CAR WHEELS
Filed Jan. 10, 1966
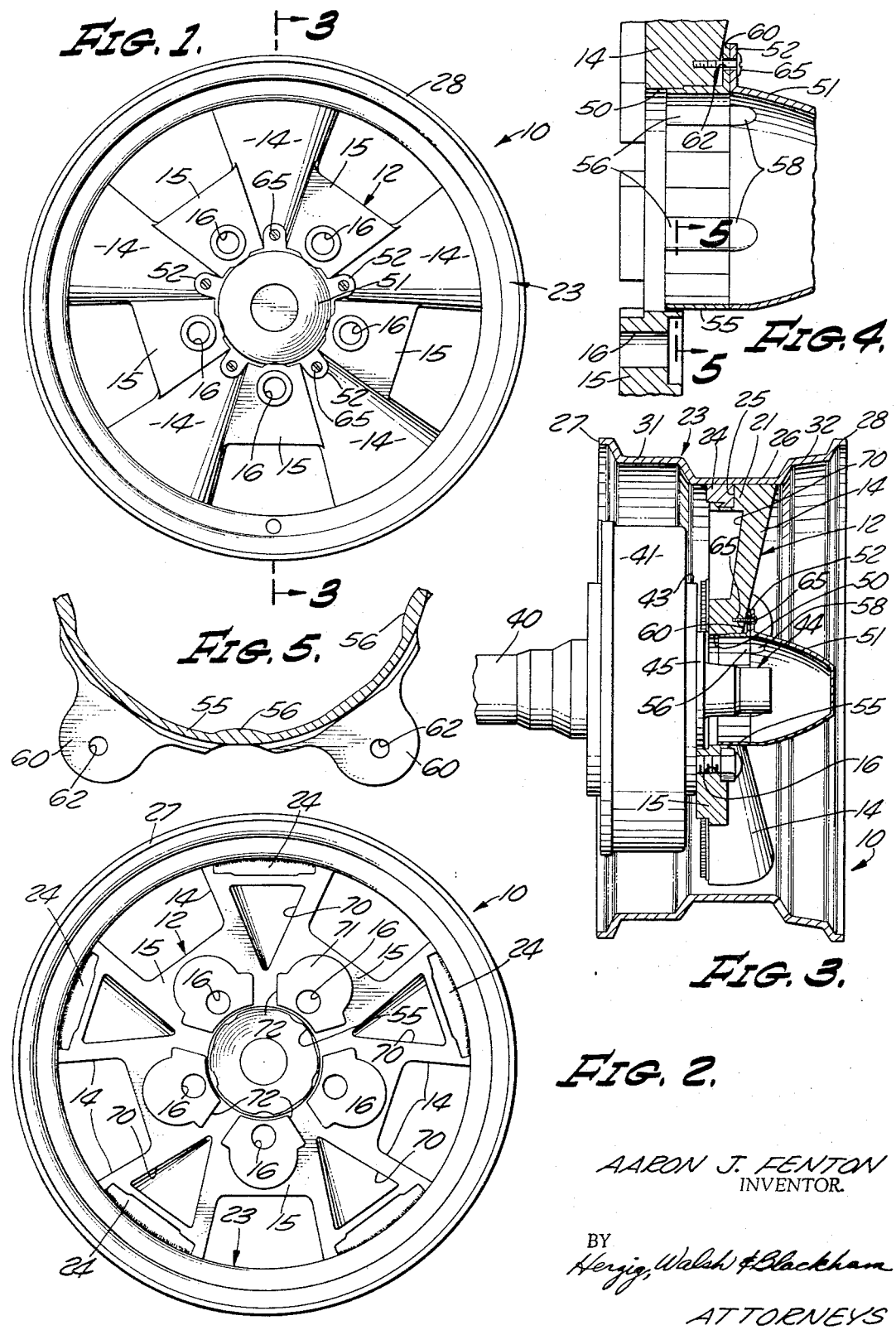
AARON J. FENTON
INVENTOR.
BY
Herzig, Walsh & Blackham
ATTORNEYS

United States Patent Office 3,346,304
Patented Oct. 10, 1967

3,346,304
AXLE CAP FOR SPORTS CAR WHEELS
Aaron J. Fenton, 1301 Monaco Drive,
Pacific Palisades, Calif. 90272
Filed Jan. 10, 1966, Ser. No. 519,627
2 Claims. (Cl. 301—108)

ABSTRACT OF THE DISCLOSURE

The invention relates to mounting of axle caps particularly of the type designed for use with sport car wheels. Ordinarily regular axle caps are of a type that fit through a center opening in the wheel, the fit being a snug fit with the cap being held in position at the inner end of the cap. The racing-type cap is of a different shape particularly in that its outer part is of bullet configuration. The device of this invention is a means for adapting or accommodating the racing-type cap to the wheel so either type cap can be used with the same wheel by the car owner. To accommodate the racing type cap to the wheel in a manner to provide appropriate clearance for the axle hub, a flange is provided which fits into the wheel opening, the flange having lugs which mate with lugs on the racing-type cap, the lugs on both the flange and the cap being secured to the wheel spokes.

---

This invention relates to novel and improved axle caps particularly adapted to use with wheels of the type especially designed for use with sports cars. Such wheels are designed to have a particularly pleasing and ornamental appearance. They may, for example, be made of aluminum having parts such as the rim, made of chrome steel, and they may be so made as to have the appearance of being made of magnesium. The wheels have a center opening around which are bolt holes arranged in a circle adapted for attaching the wheels to the brake drums of various makes of sports cars. The axle caps are cylindrical cap members having a pleasing design and appearance and constructed to be held in a position covering the axle and/or hub protruding from the center of the brake drum. Prior application, Serial No. 453,344, filed May 5, 1965, relates to axle caps for sports car wheels, the caps being of the type that fit through the center opening of the wheel. There herein invention relates to the mounting of racing type axle caps which are of bullet shape, and particularly to mounting means for this type of axle cap, the mounting means being such as to adapt the caps for mounting universally on wheels having mounting bolt holes or rings of different diameters.

It is an object of the invention to provide novel and improved means for attaching or mounting axle caps of the racing type in sports car wheels. More particularly, it is an object of the invention to provide improved means for mounting the axle caps whereby a single size of axle cap is adaptable as stated, to wheels having different diameters of mounting bolt hole circles. In a preferred form of the invention, this is accomplished by providing a ring member which interfits in the center opening of the wheel and which has extending lugs configurated to match similar lugs formed on the axle cap and so arranged that the juxtaposed lugs can be secured to outside surfaces of the wheel. In a particular wheel, in a preferred exemplary form of the invention, as described herein, the wheel has flat surfaces on the inside thereof that surround the mounting holes, and the spokes having a rounded outside configuration to which the lugs on the mounting ring and axle cap are secured.

Further objects and additional advantages of the invention will become apparent from the following detailed description and annexed drawings, wherein:

FIG. 1 is an external view of a sports car wheel having the herein invention embodied therein;
FIG. 2 is a view of the inside of the wheel and axle cap of FIG. 1;
FIG. 3 is a sectional view taken along the line 3—3 of FIG. 1;
FIG. 4 is a sectional detail view taken through the center of the wheel and axle cap and mounting; and
FIG. 5 is a sectional view taken along the line 5—5 of FIG. 4.

Referring now more particularly to FIGS. 1, 2 and 3 of the drawings, numeral 10 designates generally a form of sports car wheel in which the invention may be adapted. The wheel embodies a spider designated generally at 12 which may be an aluminum casting formed to have five generally triangular spokes such as designated at 14. The spokes may have a rounded or arcuate configuration, being arcuate with respect to a radial axis. Between the spokes are webs as designated at 15 having flat surfaces and the bolt holes extending through these webs as designated at 16.

Each spoke 14 has an arcuate flange 21 at its outer edge as shown in FIG. 3. The wheel has a rim as designated at 23 having a cross-section as shown in FIG. 3 which is secured to the flanges 21 at the extremities of the spokes by means of arcuate ribs as shown at 24 fitting into complementary formed dovetailed recesses 25 in the flanges 21. The rib members 24 may be secured to the wheel rim by welding or the like. The cross-section of the rim 23 includes a center channel 26 and edge rims or ribs 27 and 28, and portions 31 and 32 between the center channel 26 and the edge rims or ribs. The cross-section of the rim 23 is, of course, such as to receive the tire.

Numeral 40 designates the axle of a vehicle having a brake drum 41. The drum 41 has a cylindrical part 43 of smaller diameter and extending from this is the axle housing or hub 44 which has a cylindrical part 45 adjacent to the part 43.

The wheel 10 has a center opening as designated at 50. The axle cap which is the racing type of cap is designated at 51. It is circular and is tapered, being generally bullet-shaped and having extending ears or mounting lugs as designated at 52. Numeral 55 designates a cylindrical ring member which fits into the opening 50 in the center of the wheel. This member has axial splines as shown at 56 in FIG. 5 formed by inwardly extending depressions in the material of the ring. The axle cap 50 has similar short axial depressions which are positioned to form continuations of the splines 56 as designated at 58. The splines 56 fit complementary axial ribs in the side walls of the opening 50 in the wheel 10. The ring member 55 has extending ears or lugs 60 positioned to mate with the ears or lugs 52 on the axle cap 51, as may be seen in FIG. 3. All of the lugs have an opening therethrough as may be seen at 62 in FIG. 5. The axle cap 51 is attached to the wheel by means of screws as shown at 65 extending through the pairs of matching lugs 52 and 60, the screws extending into the spokes 14, as shown in FIG. 3.

FIG. 1 shows the exterior of the wheel with the axle cap in place, and FIG. 2 shows the interior of the wheel. The spokes 14 have triangular depressions 70 and depressions 71 as shown. The bolt holes 16 have adjacent flat surfaces having the shape as shown at 71. Between the flat surfaces 71 there are square shouldered radial channels or grooves as designated at 72.

In assembling the axle cap 51 to the wheel, the ring member or adaptor member 55 is inserted into the opening 50 in the wheel. The splines and lugs fix the angular position of members 55. The axle cap 51 is then fitted against the lugs 60 on the adaptor member with the lugs of the two members juxtaposed in mating position, and the parts are then secured to the wheel by the screws 65. From the foregoing it may be observed that the axle cap 51 is retained in position by means of the securement as described to the wheel and the adaptor ring 55. The matching lugs are secured to the spokes 14 between the surface portions 15. The splines on adaptor member 55 align it axially and prevent relative rotation with respect to the wheel. It may be observed that by the particular configuration of the parts as described the purposes intended are served. The mounting and securement as described serves the purpose that one size of axle cap 51 may be adapted to mounting in wheels having various diameters of bolt hole circles.

The wheel is secured to the brake drum by means of stud bolts in the conventional manner. The axle cap 51 may be made of suitable materials to provide the desired pleasing appearance. The rim 23 of the wheel may be made of chrome steel or other material of pleasing appearance. Other parts of the wheel not having the polished chrome finish may have a more or less gray finish resembling magnesium and thereby further realizing the desired pleasing appearance.

From the foregoing, those skilled in the art will observe that the invention as described herein achieves and realizes all of the objects and advantages as set forth in the foregoing, as well as having many additional advantages that are apparent from the detailed description. The invention provides for an improved, simplified, but very effective axle cap construction and mounting which is universal in that one size accommodates itself to the different wheels for which it is intended having varying diameters of bolt hole circles.

The foregoing disclose is representative of a preferred form of the invention and is to be interpreted in an illustrative rather than a limiting sense, the invention to be accorded the full scope of the claims appended hereto.

I claim:
1. As an article of manufacture for use with automobile wheels of the type having a circular center opening and circularly arranged bolt holes, axle cap means comprising a cylindrical member having lugs, the cylindrical member having a size to fit into the opening of the wheel, a cylindrical tapered axle cap, open at one end and having lugs at that end of substantially the same size as said first mentioned lugs, said lugs on the cylindrical member and cap being juxtaposed against each other, and means securing said lugs to the portion of the wheel adjacent to the opening, the said circular member and the center opening in the wheel having splined relationship.

2. A structure as in claim 1 wherein the said splines include axial ribs formed on the interior of the center opening of the wheel and axial grooves formed on the exterior of said circular member, to accommodate the said ribs.

References Cited

UNITED STATES PATENTS 1,282,301 10/1918 Sheldon.
3,154,347 10/1964 Griffith.

FOREIGN PATENTS 709,703 5/1931 Germany.

OTHER REFERENCES

Honest Charley Catalog, 19 CRR, 1963, ⅔ page 4, published Chattanooga, Tenn.
Honest Charley Catalog, CR 20, 1964, ½ page 106, Chattanooga, Tenn.

BENJAMIN HERSH, *Primary Examiner.*

RICHARD J. JOHNSON, *Examiner.*